United States Patent
Kurokawa et al.

(10) Patent No.: US 10,696,818 B2
(45) Date of Patent: *Jun. 30, 2020

(54) FLAME-RETARDANT POLYCARBONATE RESIN COMPOSITION, SHEET AND FILM USING SAME, AND MANUFACTURING METHOD FOR EACH

(71) Applicants: MITSUBISHI GAS CHEMICAL COMPANY, INC., Tokyo (JP); MGC FILSHEET CO., LTD., Saitama (JP)

(72) Inventors: Haruhiko Kurokawa, Kanagawa (JP); Atsuhiro Tokita, Osaka (JP); Hiroki Ishii, Fukushima (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/748,467

(22) PCT Filed: Aug. 29, 2016

(86) PCT No.: PCT/JP2016/075132
§ 371 (c)(1),
(2) Date: Jan. 29, 2018

(87) PCT Pub. No.: WO2017/038735
PCT Pub. Date: Mar. 9, 2017

(65) Prior Publication Data
US 2018/0215901 A1 Aug. 2, 2018

(30) Foreign Application Priority Data

Aug. 31, 2015 (JP) .................................. 2015-171095

(51) Int. Cl.
| | |
|---|---|
| C08K 5/5399 | (2006.01) |
| C08L 69/00 | (2006.01) |
| C08J 5/18 | (2006.01) |
| C08K 5/49 | (2006.01) |
| C08L 27/18 | (2006.01) |
| C08K 5/00 | (2006.01) |
| C08K 5/521 | (2006.01) |
| B32B 27/30 | (2006.01) |
| B32B 27/36 | (2006.01) |

(52) U.S. Cl.
CPC ............. *C08K 5/5399* (2013.01); *C08J 5/18* (2013.01); *C08K 5/0066* (2013.01); *C08K 5/49* (2013.01); *C08K 5/521* (2013.01); *C08L 27/18* (2013.01); *C08L 69/00* (2013.01); *B32B 27/304* (2013.01); *B32B 27/365* (2013.01); *C08J 2369/00* (2013.01); *C08J 2427/18* (2013.01); *C08L 2201/02* (2013.01)

(58) Field of Classification Search
CPC .................................................... C08K 5/5399
See application file for complete search history.

(56) References Cited

U.S. PATENT DOCUMENTS

| | | | |
|---|---|---|---|
| 2011/0269882 A1 | 11/2011 | Kurokawa et al. | |
| 2015/0086856 A1 | 3/2015 | Tomita et al. | |

FOREIGN PATENT DOCUMENTS

| | | | |
|---|---|---|---|
| JP | 2002-302597 A | 10/2002 | |
| JP | 2002-302598 A | 10/2002 | |
| JP | 2005-200588 A | 7/2005 | |
| JP | 2006-28267 A | 2/2006 | |
| JP | 2011-057888 A | 3/2011 | |
| JP | 2011-168682 A | 9/2011 | |
| JP | 2013-64047 A | 4/2013 | |
| JP | 2013-224349 A | 10/2013 | |
| JP | 2015108117 | 6/2015 | |

OTHER PUBLICATIONS

English machine translation of JP 2013-064047 A (2013).*
International Search Report from Patent Application No. PCT/JP2016/075132, dated Sep. 20, 2016.

* cited by examiner

*Primary Examiner* — Peter F Godenschwager
(74) *Attorney, Agent, or Firm* — Greenblum & Bernstein, P.L.C.

(57) ABSTRACT

The present invention provides a polycarbonate resin composition characterized by containing 73 to 94.5 mass % of a polycarbonate resin (A), 5 to 25 mass % of a phosphorus-based flame retardant (B), and 0.1 to 2 mass % of a fluoropolymer (C), and by having a flow value of $1 \times 0.01$ to $10 \times 0.01$ cm$^3$/sec at 280° C. The present invention also provides a sheet and a film using the polycarbonate resin composition.

9 Claims, No Drawings

FLAME-RETARDANT POLYCARBONATE RESIN COMPOSITION, SHEET AND FILM USING SAME, AND MANUFACTURING METHOD FOR EACH

TECHNICAL FIELD

The present invention relates to a flame-retardant polycarbonate resin composition. Specifically, the present invention relates to a polycarbonate resin composition having excellent sheet/film moldability and flame retardance, a sheet or film obtained by using the same, and a method for the production thereof.

BACKGROUND ART

Polycarbonate resins have many excellent characteristics such as excellent heat resistance, mechanical properties and electric properties and high dimensional accuracy, and therefore are widely used in a variety of fields. For example, molded products obtained by injection molding, extrusion molding or the like of polycarbonate resins are utilized for automotive materials, materials for electrical and electronic equipments, housing materials, materials for the production of parts in other industrial fields, etc.

In particular, flame retarded polycarbonate resin compositions are used as members for information/mobile devices such as computers, notebook computers, tablet terminals, smartphones and mobile phones, office automation equipments such as printers and copying machines, etc.

Recently, reduction in size and thickness of electronic equipments including the above-described information/mobile devices has been accelerated. As a member to be used, a sheet/film having high flame retardance, which is evaluated as VTM-2 or higher in the UL94 test even when the thickness thereof is 0.25 mm or less, has been desired.

For example, Patent Documents 1 and 2 describe a flame-retardant polycarbonate resin composition, wherein a phosphazene compound or a condensed phosphoric acid ester-based compound is used as a flame retardant. However, this is a composition optimized mainly for injection molding, and the viscosity of the resin component is low. In addition, since a polyfluoroethylene having fibril-forming ability, which has large shrinkage at the time of molding and poor dispersibility, is blended in the composition, it is unsuitable for the production of a film or sheet. Specifically, when this composition is molded into a film/sheet by means of a melt extrusion method, the film/sheet has a large thickness unevenness, and when a test piece having a thickness of 0.25 mm or less is subjected to the UL-94 VTM burning test, it is evaluated as non-conforming because tearing of the film during flame contact exceeds the bench mark.

Patent Document 3 describes a resin sheet, wherein a polycarbonate, a phosphorus-based flame retardant and a polyfluoroethylene are blended. However, the document does not describe any viscosity (flow value) of the resin composition. Moreover, not only a product of a polycarbonate having high flowability, but also a phosphorus-based flame retardant that increases flowability and a fibrillated polyfluoroethylene having poor dispersibility are blended in the composition of the Examples, and for this reason, a film/sheet obtained by the melt extrusion method has a large thickness unevenness. Similarly, in this case, when a test piece having a thickness of 0.25 mm or less is subjected to the UL-94 VTM burning test, it is evaluated as non-conforming because tearing of the film during flame contact exceeds the bench mark.

PRIOR ART DOCUMENTS

Patent Documents

Patent Document 1: Japanese Laid-Open Patent Publication No. 2013-224349
Patent Document 2: Japanese Laid-Open Patent Publication No. 2011-057888
Patent Document 3: Japanese Laid-Open Patent Publication No. 2005-200588

SUMMARY OF THE INVENTION

Problems to be Solved by the Invention

The problems to be solved by the present invention are to provide a polycarbonate resin composition, which is suitable for the production of a film/sheet having excellent thin-wall flame retardance with a small thickness unevenness, and a sheet/film obtained by using the same.

Means for Solving the Problems

The present inventors diligently made researches in order to solve the above-described problems, and found that when using a resin composition consisting of a mixture containing a polycarbonate, a flame retardant and a fluoropolymer having a specific flow value, a resin film/sheet having excellent flame retardance with a small thickness unevenness can be provided. Specifically, the present invention is as described below.

[1] A polycarbonate resin composition, which contains 73 to 94.5% by mass of a polycarbonate resin (A), 5 to 25% by mass of a phosphorus-based flame retardant (B) and 0.1 to 2% by mass of a fluoropolymer (C), the composition having a flow value of 1×0.01 to 10×0.01 $cm^3$/sec at 280° C.
[2] The polycarbonate resin composition according to item [1], wherein the phosphorus-based flame retardant (B) is a phosphazene compound or a condensed-type phosphoric acid ester.
[3] The polycarbonate resin composition according to item [1] or [2], wherein the fluoropolymer (C) is a polymer or copolymer comprising a tetrafluoroethylene structure.
[4] The polycarbonate resin composition according to any one of items [1] to [3], wherein the polycarbonate resin (A) has a viscosity-average molecular weight of 28,000 to 50,000.
[5] The polycarbonate resin composition according to any one of items [1] to [4], which is for a sheet or film.
[6] A sheet or film, wherein the polycarbonate resin composition according to any one of items [1] to [5] is used.
[7] The sheet or film according to item [6], which has a thickness of 10 to 1000 µm.
[8] A method for producing a sheet or film, which comprises extrusion molding the polycarbonate resin composition according to any one of items [1] to [5].
[9] The polycarbonate resin composition according to any one of items [1] to [5], wherein the fluoropolymer (C) is in the form of uncoated particles made of a polymer or copolymer containing a tetrafluoroethylene structure or particles obtained by coating the polymer or copolymer with a vinyl-based polymer.

Advantageous Effect of the Invention

When using the flame-retardant polycarbonate resin composition of the present invention, a film/sheet having excellent flame retardance with a small thickness unevenness is provided. Such a film/sheet can be suitably used as an insulation film for electrical and electronic equipments, a film for nameplates and a film for cases such as battery packs.

BEST MODE FOR CARRYING OUT THE INVENTION

Hereinafter, the present invention will be described in detail. Note that the present invention is not limited to the below-described embodiments, and can be arbitrarily changed and then carried out without departing from the gist of the present invention. Note that all the documents and publications cited herein are incorporated herein by reference in their entireties regardless of purposes thereof. In addition, the contents disclosed in the claims, specification, drawings and abstract of Japanese Patent Application No. 2015-171095 (filed on Aug. 31, 2015), to which priority is claimed by the present application, are incorporated herein by reference in their entireties.

[Polycarbonate Resin (A)]

The type of the polycarbonate resin (A) (hereinafter sometimes referred to as "the component (A)") to be used in the present invention is not particularly limited, but an aromatic polycarbonate resin is particularly preferably used in terms of heat resistance and flame retardance. The polycarbonate resin is a branched or unbranched thermoplastic polymer or copolymer, which is obtained by reacting a dihydroxy compound or this and a small amount of a branching agent with phosgene or triphosgene or carbonic acid diester.

The method for producing the polycarbonate resin is not particularly limited, and it is possible to use a polycarbonate resin produced by a conventionally known phosgene method (interfacial polymerization method), melting method (transesterification method) or the like. Further, in the case of using the melting method, it is possible to use a polycarbonate resin in which the amount of OH groups of terminal groups is adjusted.

The ratio of the polycarbonate resin (A) in the polycarbonate resin composition of the present invention (100% by mass) is 73 to 94.5% by mass, and in terms of heat resistance, it is preferably 80 to 94.5% by mass, and more preferably 85 to 93% by mass.

Examples of the dihydroxy compound as a raw material include 2,2-bis(4-hydroxyphenyl)propane (i.e., "bisphenol A"), tetramethylbisphenol A, bis(4-hydroxyphenyl)-p-diisopropylbenzene, hydroquinone, resorcinol and 4,4-dihydroxydiphenyl. Two or more of these compounds may be used in combination. In terms of heat resistance and availability, it is preferred to use bisphenol A as the main component. The polycarbonate resin containing bisphenol A as the main component is a polycarbonate resin, wherein the ratio of bisphenol A in bisphenols used is 60 to 100 mol %, and preferably 90 to 100 mol %. Further, it is also possible to use a compound in which at least one tetraalkylphosphonium sulfonate is bound to the above-described aromatic dihydroxy compound.

Further, the polycarbonate resin may be a copolymer mainly composed of a polycarbonate resin such as a copolymer of the dihydroxy compound and a compound having a siloxane structure.

For obtaining a branched polycarbonate resin, a part of the above-described dihydroxy compound may be substituted with a branching agent. The branching agent is not particularly limited, and examples thereof include a polyhydroxy compound such as phloroglucin, 4,6-dimethyl-2,4,6-tri(4-hydroxyphenyl)heptene-2, 4,6-dimethyl-2,4,6-tri(4-hydroxyphenyl)heptane, 2,6-dimethyl-2,4,6-tri(4-hydroxyphenyl)heptene-3, 1,3,5-tri(4-hydroxyphenyl)benzene and 1,1,1-tri(4-hydroxyphenyl)ethane, and 3,3-bis(4-hydroxyaryl) oxyindole (i.e., "isatinbisphenol"), 5-chloroisatin, 5,7-dichloroisatin and 5-bromoisatin. The amount of the compound to be used for substitution is usually 0.01 to 10 mol %, and preferably 0.1 to 2 mol % relative to the dihydroxy compound.

As the polycarbonate resin (A), among the above-described ones, preferred is a polycarbonate resin derived from 2,2-bis(4-hydroxyphenyl)propane (i.e., "bisphenol A") or a polycarbonate copolymer derived from 2,2-bis(4-hydroxyphenyl)propane (i.e., "bisphenol A") and another aromatic dihydroxy compound.

The above-described polycarbonate resins may be used solely, or two or more of them may be used by mixing thereof.

For adjusting the molecular weight of the polycarbonate resin (A), as a terminating agent, a monovalent hydroxy compound, for example, an aromatic hydroxy compound may be used. Examples of the monovalent aromatic hydroxy compound include m- and p-methylphenol, m- and p-propylphenol, p-tert-butylphenol and p-long chain alkyl substituted phenol.

In this specification, the polycarbonate resin (A) is a polycarbonate resin having a viscosity-average molecular weight [Mv] of 12,000 or more. A carbonate resin having a viscosity-average molecular weight of less than 12,000 is referred to as "carbonate oligomer" and distinguished from the polycarbonate resin (A).

The molecular weight of the polycarbonate resin (A) to be used in the present invention may be arbitrarily determined according to intended use and may be suitably selected and determined mainly depending on the blending ratio of the phosphorus-based flame retardant (B) and the fluoropolymer (C). From the viewpoint of moldability, strength of molded products, etc., regarding the molecular weight of the aromatic polycarbonate resin (A), the viscosity-average molecular weight [Mv] thereof is preferably 28,000 to 50,000, and more preferably 35,000 to 40,000. The molecular weight of the aromatic polycarbonate resin (A) is controlled by the amount of the terminating agent to be used, polymerization time, etc.

When the viscosity-average molecular weight is 28,000 or more, shrinkage of a film discharged from a dice derived from the fluoropolymer is suppressed by the improvement of dispersibility of the fluoropolymer (C) in the polycarbonate resin (A) and the increase of the viscosity of the resin component. As a result, thickness unevenness of a film/sheet is reduced, and in addition, the problem that a test piece is melted and torn at the time of flame contact in the burning test of thin film (insufficient flame retardance) is prevented. When the viscosity-average molecular weight is 30,000 or more, dispersibility of the fluoropolymer (C) in the polycarbonate resin (A) is further improved, shrinkage of a film during molding derived from the fluoropolymer is sufficiently suppressed, and a film/sheet with a small thickness unevenness can be obtained.

Meanwhile, when the viscosity-average molecular weight is 50,000 or less, reduction in the flowability of the polycarbonate resin composition of the present invention can be suppressed, and problems such as reduction in the extrusion processability due to increase of screw torque, reduction in the production rate and deterioration of additives due to increase of resin temperature can be suppressed.

In this regard, the viscosity-average molecular weight [Mv] of the polycarbonate resin or carbonate oligomer can be measured by the below-described method.
<Measurement Conditions for Viscosity-Average Molecular Weight (Mv)>

As a solvent, methylene chloride is used, the limiting viscosity [η] (unit: dl/g) at 20° C. is obtained using an Ubbelohde viscometer, and calculation is made according to Schnell's viscosity equation described below, thereby obtaining a value of the viscosity-average molecular weight [Mv].

$$\eta = 1.23 \times 10^{-4} \times Mv^{0.83}$$ <Schnell's Viscosity Equation>

In this regard, the value of the limiting viscosity [η] is obtained by carrying out the measurement of the specific viscosity [η$_{sp}$] with each solution concentration [C] (g/dl) and calculation according to the below-described formula.

$$\eta = \lim_{c \to 0} \eta_{sp}/c$$

The polycarbonate resin composition of the present invention may contain a carbonate oligomer in addition to the polycarbonate resin (A). However, the carbonate oligomer may affect flowability and heat resistance of the resin composition. From the viewpoint of the improvement of dispersibility of the fluoropolymer (C), suppression of shrinkage during molding and suppression of reduction in heat resistance of the resin composition, the content of the carbonate oligomer, which is a low-molecular-weight component, is preferably as small as possible. When the amount of the carbonate oligomer is large and/or the average molecular weight of the carbonate-based resin is small, for example, dispersibility of the fluoropolymer (C) may be reduced; and shrinkage of the fluoropolymer may occur during molding because the viscosity of the resin composition is low. For example, the blending amount of the carbonate oligomer is preferably 0 to 3 parts by weight, more preferably 0 to 1 parts by weight, and even more preferably substantially 0 part by weight relative to the total weight (100 parts by weight) of the polycarbonate resin (A). That is, it is preferred that the carbonate oligomer is substantially not contained. Moreover, the viscosity-average molecular weight of the carbonate-based resin component consisting of the polycarbonate resin (A) and the carbonate oligomer is preferably 28,000 to 50,000, and more preferably 35,000 to 40,000. Further, the molecular weight distribution (Mw/Mn) of the carbonate-based resin component consisting of the polycarbonate resin (A) and the carbonate oligomer is preferably 2.0 to 3.0, more preferably 2.4 to 2.8, and particularly preferably 2.4 to 2.7 from the viewpoint of flowability and heat resistance.

[Phosphorus-Based Flame Retardant (B)]

The polycarbonate resin composition of the present invention contains the phosphorus-based flame retardant (B) for the improvement of flame retardance. The ratio of the phosphorus-based flame retardant (B) in the polycarbonate resin composition (100% by mass) is 5 to 25% by mass. When the ratio is 5% by mass or more, sufficient flame retardance can be imparted thereby. When the ratio is 25% by mass or less, reduction in heat resistance of the resin composition can be suppressed. Moreover, from the viewpoint of the balance between flame retardance and heat resistance, the ratio is preferably 6 to 20% by mass, and more preferably 7 to 15% by mass.

As the phosphorus-based flame retardant (B), a phosphoric acid ester-based flame retardant, a phosphazene-based flame retardant, etc. can be used. As the phosphorus-based flame retardant (B), such flame retardants may be used solely, or two or more of them may be used as a mixture.
<Phosphoric Acid Ester-Based Flame Retardant>

As the phosphorus-based flame retardant (B), in particular, a phosphoric acid ester-based flame retardant is preferably used because it has high flame retardant effect and also has flowability improvement effect. The phosphoric acid ester-based flame retardant is not limited, but it is particularly preferably a phosphoric acid ester-based compound represented by general formula (IIa) below.

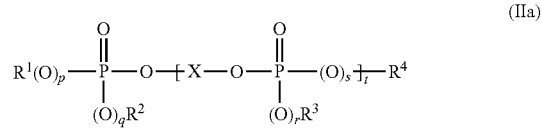

(In formula (IIa): $R^1$, $R^2$, $R^3$ and $R^4$ each independently represent a $C_{1-8}$ alkyl group which may be substituted with a $C_{1-8}$ alkoxy group, or a $C_{6-20}$ aryl group which may be substituted with a $C_{1-8}$ alkyl group or phenyl which may be substituted with a $C_{1-8}$ alkyl group; p, q, r and s are each independently 0 or 1; t is an integer of 0 to 5; and X represents an arylene group or a divalent group represented by formula (IIp) below.)

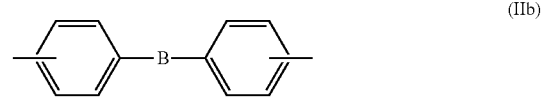

(In formula (IIb): B is a single bond, —C(CH$_3$)$_2$—, —SO$_2$—, —S— or —O—.)

In the above-described general formula (IIa), examples of the aryl group of $R^1$ to $R^4$ include a phenyl group and a naphthyl group. Further, examples of the arylene group of X include a phenylene group and a naphtylene group. When t is 0, the compound represented by general formula (IIa) is a phosphoric acid ester, and when t is larger than 0, the compound is a condensed phosphoric acid ester (including a mixture). In the present invention, the condensed phosphoric acid ester is particularly preferably used.

Specific examples of the phosphoric acid ester-based flame retardant represented by general formula (IIa) above include trimethyl phosphate, triethyl phosphate, tributyl phosphate, trioctyl phosphate, tributoxyethyl phosphate, triphenyl phosphate, tricresyl phosphate, tricresylphenyl phosphate, octyldiphenyl phosphate, diisopropylphenyl phosphate, bisphenol A tetraphenyl diphosphate, bisphenol A tetracresyl diphosphate, bisphenol A tetraxylyl diphosphate, hydroquinone tetraphenyl diphosphate, hydroquinone tetracresyl diphosphate, hydroquinone tetraxylyl diphosphate, resorcinol tetraphenyl diphosphate, resorcinol bisdixylenyl phosphate, etc. Among them, preferred are triphenyl phosphate, bisphenol A tetraphenyl diphosphate, resorcinol tetraphenyl diphosphate, resorcinol bisdi-2,6-xylenyl phosphate, etc. Examples of commercially-available phosphoric acid ester-based flame retardants include FP-600 manufactured by ADEKA Corporation and PX-200 manufactured by Daihachi Chemical Industry Co., Ltd.

The above-described phosphoric acid ester-based flame retardants may be used solely, or two or more of them may be used as a mixture.

<Phosphazene-Based Flame Retardant>

The phosphazene-based flame retardant can suppress reduction in heat resistance of the resin composition due to addition of the flame retardant more than the phosphoric acid ester-based flame retardant, and therefore can be used as an effective phosphorus-based flame retardant. The phosphazene-based flame retardant is an organic compound having a —P=N— bond in the molecule. Preferred examples of the phosphazene-based flame retardant include a cyclic phosphazene compound represented by general formula (IIIa) below, a linear phosphazene compound represented by general formula (IIIb) below, and a crosslinked phosphazene compound in which at least one phosphazene compound selected from the group consisting of compounds of general formulae (IIIa) and (IIIb) below is crosslinked with a crosslinking group. As the crosslinked phosphazene compound, those obtained by crosslinking with a crosslinking group represented by general formula (IIIc) below are preferred in terms of flame retardance.

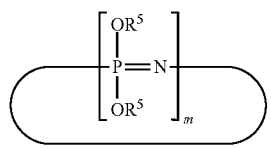
(IIIa)

(In formula (IIIa): m is an integer of 3 to 25; and $R^5$s may be the same or different and represent an aryl group or an alkylaryl group.)

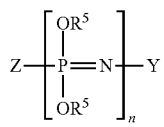
(IIIb)

(In formula (IIIb): n is an integer of 3 to 10,000; Z represents a —N=P(OR$^5$)$_3$ group or a —N=P(O)OR$^5$ group; and Y represents a —P(OR$^5$)$_4$ group or a —P(O)(OR$^5$)$_2$ group. $R^5$s may be the same or different and represent an aryl group or an alkylaryl group.)

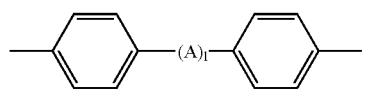
(IIIc)

(In formula (IIIc): A is —C(CH$_3$)$_2$—, —SO$_2$—, —S— or —O—; and l is 0 or 1.)

Preferred examples of cyclic and/or linear phosphazene compounds represented by general formulae (IIIa) and (IIIb) include those in which $R^5$ is a $C_{6-20}$ aryl group which may be substituted with a $C_{1-6}$ alkyl group. Specific examples thereof include: a cyclic or linear phosphazene compound in which $R^5$ is an aryl group such as a phenyl group; a cyclic or linear phenoxyphosphazene in which $R^5$ is a $C_{6-20}$ aryl group which is substituted with a $C_{1-6}$, preferably $C_{1-3}$ alkyl such as a tolyl group (o-, m- or p-tolyloxy group) and a xylyl group (2,3-, 2,6- or 3,5-xylyl group); and a cyclic or linear phenoxyphosphazene in which the above-described $R^5$s are combined. More specific examples thereof include: a cyclic and/or linear $C_{1-6}$ alkyl $C_{6-20}$ aryloxy phosphazene such as phenoxyphosphazene, (poly)tolyloxyphosphazene (e.g., o-tolyloxyphosphazene, m-tolyloxyphosphazene, p-tolyloxyphosphazene, o,m-tolyloxyphosphazene, o,p-tolyloxyphosphazene, m,p-tolyloxyphosphazene, o,m,p-tolyloxyphosphazene, etc.) and (poly)xylyloxyphosphazene; and a cyclic and/or linear $C_{6-20}$ aryl $C_{1-10}$ alkyl $C_{6-20}$ aryloxy phosphazene such as (poly)phenoxytolyloxyphosphazene (e.g., phenoxy-o-tolyloxyphosphazene, phenoxy-m-tolyloxyphosphazene, phenoxy-p-tolyloxyphosphazene, phenoxy-o,m-tolyloxyphosphazene, phenoxy-o,p-tolyloxyphosphazene, phenoxy-m,p-tolyloxyphosphazene, phenoxy-o,m,p-tolyloxyphosphazene, etc.), (poly)phenoxyxylyloxyphosphazene and (poly)phenoxytolyloxyxylyloxyphosphazene. Preferred are a cyclic and/or linear phenoxyphosphazene, a cyclic and/or linear $C_{1-3}$ alkyl $C_{6-20}$ aryloxy phosphazene, and a $C_{6-20}$ aryloxy $C_{1-3}$ alkyl $C_{6-20}$ aryloxy phosphazene (e.g., a cyclic and/or linear tolyloxyphosphazene, a cyclic and/or linear phenoxytolylphenoxyphosphazene, etc.). In this regard, "$C_{1-6}$" means that "the carbon number is 1 to 6", and the same applies to "$C_{6-20}$", "$C_{1-10}$", etc. Further, "(poly)phenoxy . . . " means one or both of "phenoxy . . . " and "polyphenoxy . . . ".

As the cyclic phosphazene compound represented by general formula (IIIa), a cyclic phenoxyphosphazene in which $R^5$ is a phenyl group is particularly preferred. Further, the cyclic phenoxyphosphazene compound is preferably a compound represented by general formula (IIIa), wherein m is an integer of 3 to 8, and may also be a mixture of compounds in which the numbers for m differ from each other. Specific examples thereof include compounds such as hexaphenoxycyclotriphosphazene (compound in which m is 3), octaphenoxycyclotetraphosphazene (compound in which m is 4) and decaphenoxycyclopentaphosphazene (compound in which m is 5), and mixtures thereof. Among them, preferred is a mixture containing 50% by mass or more of a compound in which m is 3, 10 to 40% by mass of a compound in which m is 4 and 30% by mass or less of compounds in which m is 5 or more.

For example, ammonium chloride is reacted with phosphorus pentachloride at 120 to 130° C. to obtain a mixture of cyclic and linear chlorophosphazenes, from which cyclic chlorophosphazenes such as hexachlorocyclotriphosphazene, octachlorocyclotetraphosphazene and decachlorocyclopentaphosphazene are taken out, and then these are subjected to substitution with a phenoxy group, thereby obtaining the above-described cyclic phenoxyphosphazene compound.

As the linear phosphazene compound represented by general formula (IIIb), a linear phenoxyphosphazene in which $R^5$ is a phenyl group is particularly preferred. Examples of the above-described linear phenoxyphosphazene compound include compounds obtained by subjecting a chloride of the cyclic phenoxyphosphazene compound obtained by the above-described method (e.g., hexachlorocyclotriphosphazene) to ring-opening polymerization at 220 to 250° C. and substituting a linear dichlorophosphazene having a polymerization degree of 3 to 10,000 obtained with a phenoxy group. Regarding the linear phenoxyphosphazene compound, n in general formula (IIIb) is preferably 3 to 1,000, more preferably 3 to 100, and even more preferably 3 to 25.

Examples of the crosslinked phenoxyphosphazene compound include compounds having a crosslinked structure of a 4,4'-diphenylene group such as a compound having a crosslinked structure of 4,4'-sulfonyldiphenylene (bisphenol S residue), a compound having a crosslinked structure of a 2,2-(4,4'-diphenylene)isopropylidene group, a compound having a crosslinked structure of a 4,4'-oxydiphenylene group, and a compound having a crosslinked structure of a 4,4'-thiodiphenylene group.

Further, as the crosslinked phosphazene compound, a crosslinked phenoxyphosphazene compound, wherein a cyclic phenoxyphosphazene compound in which $R^5$ in general formula (IIIa) is a phenyl group is crosslinked with a crosslinking group represented by general formula (IIIc) above, or a crosslinked phenoxyphosphazene compound, wherein a linear phenoxyphosphazene compound in which $R^5$ in general formula (IIIb) above is a phenyl group is crosslinked with a crosslinking group represented by general formula (IIIc) above, is preferred in terms of flame retardance, and a crosslinked phenoxyphosphazene compound, wherein the cyclic phenoxyphosphazene compound is crosslinked with a crosslinking group represented by general formula (IIIc) above, is more preferred.

Further, the content of the phenylene group in the crosslinked phenoxyphosphazene compound is usually 50 to 99.9%, and preferably 70 to 90% based on the total number of the phenyl group and the phenylene group in the cyclic phosphazene compound represented by general formula (IIIa) and/or the linear phenoxyphosphazene compound represented by general formula (IIIb). Moreover, the crosslinked phenoxyphosphazene compound is particularly preferably a compound not having a free hydroxyl group in the molecule.

In the present invention, in teams of flame retardance and mechanical properties, the phosphazene-based flame retardant is preferably at least one selected from the group consisting of a cyclic phenoxyphosphazene compound represented by general formula (IIIa) above and a crosslinked phenoxyphosphazene compound, wherein a cyclic phenoxyphosphazene compound represented by general formula (IIIa) above is crosslinked with a crosslinking group. Examples of commercially-available phosphazene-based flame retardants include "Rabitle FP-110" and "Rabitle FP-110T" manufactured by Fushimi Pharmaceutical Co., Ltd. and "SPS100" manufactured by Otsuka Chemical Co., Ltd. which are cyclic phenoxyphosphazenes.

The above-described phosphazene-based flame retardants may be used solely, or two or more of them may be used as a mixture.

[Fluoropolymer (C)]

The fluoropolymer (C) is added in order to prevent dripping of a burning material of the polycarbonate resin composition of the present invention.

Examples of the fluoropolymer include a fluoroolefin resin. The fluoroolefin resin is usually a polymer or copolymer containing a fluoroethylene structure. The polymer or copolymer containing a fluoroethylene structure is a polymer mainly composed of a fluoroethylene structure (structural unit). Specifically, the ratio of the fluoroethylene structure (structural unit of fluoroethylene) is preferably 40 to 100% by mass, more preferably 50 to 100% by mass, and even more preferably 60 to 100% by mass of all the monomer units constituting the fluoropolymer. The number-average molecular weight of polytetrafluoroethylene is not particularly limited, but it is preferably 3,000,000 to tens of millions (e.g., 3,000,000 to 90,000,000).

Specific examples thereof include a polydifluoroethylene resin, a polytetrafluoroethylene resin, a tetrafluoroethylene/hexafluoropropylene copolymer resin and a tetrafluoroethylene/perfluoroalkylvinylether copolymer resin. Among them, preferred is a polytetrafluoroethylene resin in terms of flame retardance. Further, in terms of prevention/suppression effects for dripping of a test piece, a fluoroethylene resin having fibril-forming ability is also preferably used. Note that "fibril-forming ability" means that resins show tendency to be bound together to become fibrous due to an external action such as a shear force.

Examples of the fluoroethylene resin having fibril-forming ability include "Teflon (registered trademark) 6J" and "Teflon (registered trademark) 640J" manufactured by Du Pont-Mitsui Fluorochemicals Co., Ltd. and Polyflon F-series (e.g., "Polyflon F201L", "Polyflon F103", "Polyflon FA500B" and "Polyflon FA500H") manufactured by Daikin Industries, Ltd. In addition, examples of commercially-available aqueous dispersions of the fluoroethylene resin having fibril-forming ability include "Teflon (registered trademark) 30J" and "Teflon (registered trademark) 31-JR" manufactured by Du Pont-Mitsui Fluorochemicals Co., Ltd. and "Fluon D-1" manufactured by Daikin Industries, Ltd.

In the present invention, the form of the fluoropolymer (C) is not particularly limited, but it is preferably in the form of fine particles.

Moreover, it is also possible to use a fluoroethylene polymer having a multilayer structure, wherein a fluoroethylene polymer is coated with a polymer obtained by polymerizing a vinyl-based monomer (vinyl-based polymer) (modified polytetrafluoroethylene). Such a modified polyfluoroethylene is advantageous in terms of handling at the time of compounding of raw materials. Specific examples of the modified polyfluoroethylene include a polystyrene-fluoroethylene complex, a polystyrene-acrylonitrile-fluoroethylene complex, a polymethyl methacrylate-fluoroethylene complex and a polybutyl methacrylate-fluoroethylene complex. Specific examples thereof include "Metablen A-3800" manufactured by Mitsubishi Rayon Co., Ltd. and "Blendex 449" manufactured by GE Specialty Chemical. Among them, preferred is an acrylic-modified polyfluoroethylene having a multilayer structure consisting of a (meth)acrylic resin (e.g., polymethyl methacrylate and polybutyl methacrylate) and a fluoroethylene resin.

In one embodiment of the present invention, the fluoropolymer (C) is in the form of uncoated particles (i.e., non-core-shell type uniform particles) made of a polymer or copolymer containing a tetrafluoroethylene structure or particles obtained by coating the polymer or copolymer with the above-described vinyl-based polymer.

Note that one type of a fluoropolymer may be contained, or two or more types of fluoropolymers may be contained with any combination and any ratio.

The ratio of the fluoropolymer in the polycarbonate resin composition of the present invention (100% by mass) is 0.1 to 2% by mass. When the ratio of the fluoropolymer is less than 0.1% by mass, the effect of improving flame retardance exerted by the fluoropolymer may be insufficient. When the ratio of the fluoropolymer is more than 2% by mass, poor outer appearance, thickness unevenness and reduction in mechanical strength of a molded product obtained by molding the polycarbonate resin composition may be caused. In consideration of flame retardance, thickness unevenness and outer appearance, the ratio of the fluoropolymer is more preferably 0.5 to 1% by mass.

[Other Components]
(Other Resin Components)

The aromatic polycarbonate resin composition of the present invention may contain resin components other than the polycarbonate resin (A) and the fluoropolymer (C) within a range in which the purpose of the present invention is not impaired. Examples of other resin components which can be blended include a polystyrene resin, a high impact polystyrene resin, a hydrogenated polystyrene resin, a polyacrylstyrene resin, an ABS resin, an AS resin, an AES resin, an ASA resin, an SMA resin, a polyalkyl methacrylate resin, a polymethacrylic methacrylate resin, a polyphenylether resin, a polycarbonate resin other than the component (A), an amorphous polyalkylene terephthalate resin, a polyester resin, an amorphous polyamide resin, poly-4-methylpentene-1, a cyclic polyolefin resin, an amorphous polyarylate resin and polyethersulfone.

(Other Additives)

The aromatic polycarbonate resin composition of the present invention may further contain various additives within a range in which the effects of the present invention are not reduced. Examples of such additives include a stabilizer, an antioxidant, a mold release agent, an ultraviolet absorber, a stain pigment, an antistatic agent, a flame retardant, an impact strength modifier, a plasticizer, a dispersing agent, an antimicrobial agent and an inorganic filler (a silicate compound, glass fiber, carbon fiber, etc.). One type of such an additive for resin may be contained, or two or more types of such additives may be contained with any combination and any ratio.

[Method for Producing Polycarbonate Resin Composition]

The method for producing the polycarbonate resin composition of the present invention is not limited, and a wide range of publicly-known methods for producing a polycarbonate resin composition can be employed.

Specific examples thereof include a method in which the polycarbonate resin (A), the phosphorus-based flame retardant (B) and the fluoropolymer (C) of the present invention, and other components, which are blended according to need, are mixed together in advance using, for example, a mixing machine such as a tumbler, a Henschel mixer and a super mixer, and then the mixture is melt-kneaded using a mixing machine such as a Bunbury mixer, a roller, a Brabender, a single screw kneading extruder, a twin screw kneading extruder and a kneader.

[Flow Value of Polycarbonate Resin Composition]

The polycarbonate resin composition of the present invention is characterized in that the flow value of the resin composition at 280° C. is 1×0.01 to 10×0.01 cm$^3$/sec. The flow value (Q value) as used herein refers to a value measured by the method described in JIS K7210-1: 2014 Annex JA. For the measurement, a flow tester CFD500D manufactured by Shimadzu Corporation is used, a die having a hole diameter of 1.0 mm and a length of 10 mm is used, and the amount of molten resin discharged at a test temperature of 280° C. with a test force of 160 kg/cm$^2$ and a preheating time of 420 sec is used as the flow value (×0.01 cm$^3$/sec).

When the flow value of the resin composition is lower than 1×0.01 cm$^3$/sec, the flowability is insufficient. For this reason, the torque at the time of melt extrusion of the sheet or film increases, the productivity is reduced, and additives and the like are deteriorated due to shear heating. When the flow value is higher than 10×0.01 cm$^3$/sec, the flowability is high. For this reason, the amount of shrinkage of the film/sheet discharged from an extruder die derived from the fluoropolymer cannot be suppressed, thickness unevenness of the film/sheet is caused, and a test piece is melted and torn at the time of flame contact in the burning test of thin films and therefore flame retardance cannot be obtained. In terms of film moldability in the melt extrusion molding method, the flow value of the resin composition is preferably 2×0.01 cm$^3$/sec or more. Further, in terms of further reduction of thickness unevenness of the sheet/film, the flow value of the resin composition is preferably 9×0.01 cm$^3$/sec or less, and more preferably 8×0.01 cm$^3$/sec or less.

The flow value within the above-described range is suitable for the production of films/sheets by means of extrusion molding. Specifically, the present inventors focused attention on the flow value of the resin composition, and found that the flow value is associated with thickness unevenness and thin-wall flame retardance in the case of thin layers. By controlling the flow value of the resin composition within the above-described range, thickness unevenness of a thin-layer product can be suppressed and flame retardance can be imparted to the product. Note that in the case of conventional molding (injection molding) and the like, a resin composition having a flow value of 10×0.01 to 50×0.01 cm$^3$/sec is generally used, and the range of the flow value differs from the range of the present invention. For example, the flow value of "Iupilon (registered trademark) H-4000" manufactured by Mitsubishi Engineering-Plastics Corporation, which is used for injection molding, is within the above-described range (10×0.01 to 50×0.01 cm$^3$/sec).

The flow value of the polycarbonate resin composition can be adjusted within a desired range by controlling the blending ratio of the constituents (A) to (C), the type of each of the constituents (A) to (C) or the like. For example, the flow value can be adjusted within a desired range by controlling the below-described items.

1) Viscosity-average molecular weight (Mv) of polycarbonate resin (A)

In general, when Mv is increased, the flow value tends to decrease.

2) Blending ratio of phosphorus-based flame retardant (B)

In general, when the content of the phosphorus-based flame retardant is increased, the flow value increases.

3) Composition and viscosity-average molecular weight (Mv) of carbonate resin component In general, when Mv is increased, the flow value tends to decrease.

In general, when the content of the carbonate oligomer that is a low molecular weight component is increased, the flow value tends to increase.

[Method for Molding Polycarbonate Resin Composition]

The polycarbonate resin composition of the present invention can be made into molded bodies with various forms. In particular, when using the polycarbonate resin composition of the present invention, it is possible to provide a thin-walled molded article having excellent flame retardance, which is difficult to be realized by conventional polycarbonate resin compositions. Examples of applications of the molded article of the present invention include electrical and electronic equipments, office automation equipments, information terminal devices, machine components, home appliances, vehicle components, building components, various containers, leisure goods/sundries and components for lighting equipments, etc. In particular, because of excellent flame retardance, the molded article of the present invention is suitably used for electrical and electronic equipments, office automation equipments, information terminal devices, home appliances, components for lighting equipments, etc. and nameplates, and particularly suitably used for electrical and electronic equipments, components for lighting equipments and sheet members. In particular, the polycarbonate resin composition of the present invention is suitably used for molding into a sheet or film, and a sheet or film having excellent thin-wall flame retardance with a small thickness unevenness is obtained.

The method for producing a sheet or film from the polycarbonate resin composition of the present invention is not particularly limited. For example, molding methods such as the melt extrusion molding method, the solution casting method, the blow molding method and the inflation molding method can be used. Among them, preferred is the extrusion molding method from the viewpoint of continuous productivity. In one preferred embodiment, the method for producing a sheet or film includes a step of extrusion molding the polycarbonate resin composition.

In the present invention, a non-reinforced thermoplastic resin layer may be laminated on one or both of surfaces of the outer layer of the sheet or film made of the polycarbonate resin. Specifically, according to one embodiment of the present invention, a laminated sheet or film, which has a thermoplastic resin layer on at least one surface of the polycarbonate resin layer, is provided. By employing this embodiment, good surface smoothness, glossiness and impact resistance can be obtained, and when printing is made on the back surface of the non-reinforced layer, deep outer appearance can be obtained.

Further, the thermoplastic resin to be laminated may contain various additives. Examples of such additives include a stabilizer, an antioxidant, a mold release agent, an ultraviolet absorber, a stain pigment, an antistatic agent, a flame retardant, an impact strength modifier, a plasticizer, a dispersing agent and an antimicrobial agent. One type of such an additive for resin may be contained, or two or more types of such additives may be contained with any combination and any ratio.

Note that the "sheet" generally refers to a thin and flat product whose thickness is small considering the length and width thereof, and the "film" refers to a thin and flat product whose thickness is extremely small considering the length and width thereof, wherein the maximum thickness is arbitrarily limited, which is usually supplied in the form of a roll. However, in this specification, the "sheet" is not clearly distinguished from the "film", and these terms are used as the same meaning.

[Thickness of Film/Sheet]

The thickness of the film or sheet obtained from the polycarbonate resin composition of the present invention (polycarbonate resin layer in the case of a laminated body) is preferably 10 to 1000 µm, more preferably 30 to 500 µm, and even more preferably 30 to 200 µm. The film or sheet obtained from the polycarbonate resin composition of the present invention has a small thickness unevenness.

EXAMPLES

Hereinafter, the present invention will be described in more detail by way of examples. However, the present invention is not limited to the below-described examples, and can be arbitrarily changed and then carried out without departing from the gist of the present invention.

<Measurement of Flow Value of Resin Composition>

The flow value (Q value) of the resin composition pellet was evaluated by reference to the method described in JIS K7210-1: 2014 Annex JA. For the measurement, a flow tester CFD500D manufactured by Shimadzu Corporation was used, a die having a hole diameter of 1.0 mm and a length of 10 mm was used, and the amount of molten resin discharged at a test temperature of 280° C. with a test force of 160 kg/cm$^2$ and a preheating time of 420 sec was used as the flow value (×0.01 cm$^3$/sec). Note that the evaluation is described as "flow value" in the tables.

<Measurement of Thickness (Film Thickness Distribution) of Resin Film>

The film thickness distribution of the resin film was measured using a contact type desk-top off-line thickness measurement device (TOF-5R) manufactured by Yamabun Electronics Co., Ltd. The thickness of the central portion of the film was measured at 140 points in total at 10 mm intervals along the flow direction (MD direction) at the time of extrusion molding, and the average value and the standard deviation of the film thickness were obtained to evaluate variation of the film thickness. Note that the evaluation is described as "average film thickness" and "film thickness standard deviation" in the tables. Regarding the variation of the film thickness (thickness unevenness), the case where the film thickness standard deviation is 0 µm or more and less than 2 µm can be judged as "very good", the case where it is 2 µm or more and less than 4 µm can be judged as "good", and the case where it is 4 µm or more can be judged as "poor".

<Evaluation of Flame Retardance>

The flame retardance of the polycarbonate resin film was evaluated by a method according to the UL94/VTM burning test established by Underwriters Laboratories (UL, US) using a cut film (width: 50 mm×length: 200 mm×thickness: 50 µm). In this evaluation, based on the criteria shown in Table 1 below, the case judged as VTM-0 was regarded as conforming, and the case where deformation (melting/tearing) of a test piece at the time of flame contact exceeded the bench mark was regarded as non-conforming. Note that the evaluation is described as "UL94 flame retardance" in the tables.

(Evaluation Method)

(i) Preparation of Measurement Samples

Measurement samples were cut into the above-described size (width: 50 mm×length: 200 mm×thickness: 50 µm).

A sample left at 23° C. and 50% RH for 48 hours was referred to as Sample A, and a sample left at 70° C. for 168 hours and then cooled at 23° C. and at 20% RH or lower for 4 hours was referred to as Sample B. For each of them, one set consisting of 5 samples was prepared.

(ii) Measurement Method

A line was drawn on each sample at a position 125 mm away from the short side thereof in the direction parallel to the short side, and the sample was wound around a stick having a diameter of 12.7 mm in a manner such that the short side was in the vertical direction. The portion 75 mm or more above the 125 mm mark was fixed with a pressure sensitive tape and then the stick was pulled out. The upper end of the sample was closed in order to prevent the stack effect during the test. Next, each sample was set vertically, and an absorbent cotton was placed 300 mm below the sample. A Bunsen burner having a diameter of 9.5 mm and a length of flame of 20 mm as a heating source was placed in a manner such that the tube of the burner was positioned 10 mm below the lower end of the sample. The center portion of the lower end of the sample was brought into contact with blue flame for 3 seconds, and the burning time (t1) after the flame was moved away for the first time was measured. Next, immediately after burning stopped, flame contact for 3 seconds was performed again, and the burning time (t2) after the flame was moved away for the second time was measured. In addition, the presence or absence of a burning falling object which causes absorbent cotton ignition was observed. The above-described measurement was carried out for Sample A and Sample B, each of which consisted of a set of 5 samples.

Regarding each sample, the burning time (t1) after the flame was moved away for the first time was compared to the burning time (t2) after the flame was moved away for the second time, and the longer one (t1 or t2) was evaluated as "Maximum burning time of each sample". The total burning time of 5 samples (the total of t1+t2 of 5 samples) was evaluated as "Total burning time of 5 samples". The presence or absence of a burning falling object which causes absorbent cotton ignition was evaluated as the presence or absence of "cotton ignition due to dripping".

TABLE 1

|  | VTM-0 | VTM-1 | VTM-2 |
|---|---|---|---|
| Maximum burning time of each sample | 10 sec or less | 30 sec or less | 30 sec or less |
| Total burning time of 5 samples | 50 sec or less | 250 sec or less | 250 sec or less |
| Cotton ignition due to dripping | No | No | Yes |

[Materials Used]
<Aromatic Polycarbonate Resin (A)>
(a-1) "Iupilon (registered trademark) K-4000F" manufactured by Mitsubishi Engineering-Plastics Corporation, bisphenol A-type, viscosity-average molecular weight: 40,000, Mw/Mn=2.7
(a-2) "Iupilon (registered trademark) E-2000F" manufactured by Mitsubishi Engineering-Plastics Corporation, bisphenol A-type, viscosity-average molecular weight: 28,000, Mw/Mn=2.5
(a-3) "Iupilon (registered trademark)S-3000F" manufactured by Mitsubishi Engineering-Plastics Corporation, bisphenol A-type, viscosity-average molecular weight: 23,000
<Phosphorus-Based Flame Retardant (B)>
(b-1) Phenoxyphosphazene ("Rabitle FP-110T" manufactured by Fushimi Pharmaceutical Co., Ltd.) (a compound, wherein m≥3 (main structure: cyclic trimer) and $R^5$ is a phenyl group in formula (IIIa) above)
(b-2) Resorcinol bis-2,6-xylenyl phosphate ("PX-200" manufactured by Daihachi Chemical Industry Co., Ltd.)

<Fluoropolymer (C)>
(c-1) Polytetrafluoroethylene having fibril-forming ability ("Polyflon FA-500H" manufactured by Daikin Industries, Ltd.)
(c-2) Polytetrafluoroethylene coated with acrylic resin (polymethyl methacrylate), PTFE content: 50% by mass ("Metablen A-3750" manufactured by Mitsubishi Rayon Co., Ltd.)
<Other Additives (D)>
(d-1) Antioxidant: Pentaerythritol tetrakis[3-(3,5-di-tert-butyl-4-hydroxyphenyl)propionate] (ADK STAB "AO-60" manufactured by ADEKA Corporation)
(d-2) Antioxidant: Tris(2,4-di-tert-butylphenyl)phosphite (ADK STAB "2112" manufactured by ADEKA Corporation)

Examples 1-6 and Comparative Examples 1-7

<Production of Resin Pellet>
A polycarbonate resin composition having a composition described in Tables 2 and 3 was obtained as described below.
Using a twin screw extruder having one vent, TEX30α (C18 block, L/D=55) manufactured by The Japan Steel Works, Ltd., components were kneaded at a screw rotation speed of 200 rpm, at a discharge rate of 20 kg/hour, and at a barrel temperature of 300° C., and the molten resin extruded into a strand-like shape was rapidly cooled in a water bath and pelletized using a pelletizer. The flow value of the obtained pellet is shown in Tables 2 and 3.
<Production of Resin Film>
A film was obtained from the obtained pellet made of the polycarbonate resin composition by means of extrusion molding as described below.
Using a single screw extruder PSV-30 manufactured by Plaengi Co., Ltd., a film (width: 25 cm×length: 10 m×thickness: 0.05 mm) was obtained at a cylinder temperature of 300° C., at a die temperature of 300° C., at a roll temperature of 110° C. and at a screw rotation speed of 30 rpm. Note that in the case where the blending amount of the phosphorus-based flame retardant was 2%, the roll temperature was set at 130° C. Further, in the case where the blending amount of the phosphorus-based flame retardant was 32%, molding was performed with the roll temperature being set at 50° C. because the glass transition temperature of the resin composition was low. The evaluation results (average film thickness, film thickness standard deviation and UL94 flame retardance) of films obtained are shown in Tables 2 and 3.

TABLE 2

|  | Items | Letters and numerals/units |  | Example 1 | Example 2 | Example 3 | Example 4 | Example 5 | Example 6 |
|---|---|---|---|---|---|---|---|---|---|
| Resin composition (% by mass) | (A) polycarbonate | (a-1) | K-4000F | 87.92 | 87.42 | 83.92 | 91.42 | 80.92 |  |
|  |  | (a-2) | E-2000F |  |  |  |  |  | 90.22 |
|  |  | (a-3) | S-3000F |  |  |  |  |  |  |
|  | (B) phosphorus-based flame retardant | (b-1) | FP-110T | 11.5 | 11.5 |  | 7.5 | 18 | 10 |
|  |  | (b-2) | PX-200 |  |  | 15 |  |  |  |
|  | (C) fluoropolymer | (c-1) | FA-500H | 0.5 |  |  |  |  | 0.5 |
|  |  | (c-2) | A-3750 |  | 1 | 1 | 1 | 1 |  |
|  | (D) other additives | (d-1) | AO-60 | 0.05 | 0.05 | 0.05 | 0.05 | 0.05 | 0.05 |
|  |  | (d-2) | 2112 | 0.03 | 0.03 | 0.03 | 0.03 | 0.03 | 0.03 |
| Evaluation results | Flow value | ×0.01 cm³/sec |  | 6.2 | 5.1 | 8.3 | 2.0 | 10.0 | 9.2 |
|  | Average film thickness | μm |  | 50 | 52 | 50 | 50 | 51 | 51 |
|  | Film thickness standard deviation | μm |  | 2.2 | 1.8 | 1.9 | 1.5 | 2.5 | 3.1 |
|  | UL94 flame retardance |  |  | VTM-0 | VTM-0 | VTM-0 | VTM-0 | VTM-0 | VTM-0 |

TABLE 3

| | Items | Letters and numerals/units | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Resin composition (% by mass) | (A) polycarbonate | (a-1) | K-4000F | | | | 73.42 | 97.42 | 88.42 | 85.92 |
| | | (a-2) | E-2000F | | 87.92 | 87.42 | | | | |
| | | (a-3) | S-3000F | 87.92 | | | | | | |
| | (B) phosphorus-based flame retardant | (b-1) | FP-110T | 11.5 | 11.5 | 11.5 | 26 | 2 | 11.5 | 11.5 |
| | | (b-2) | PX-200 | | | | | | | |
| | (C) fluoropolymer | (c-1) | FA-500H | 0.5 | 0.5 | | 0.5 | 0.5 | 0 | 2.5 |
| | | (c-2) | A-3750 | | | 1 | | | | |
| | (D) other additives | (d-1) | AO-60 | 0.05 | 0.05 | 0.05 | 0.05 | 0.05 | 0.05 | 0.05 |
| | | (d-2) | 2112 | 0.03 | 0.03 | 0.03 | 0.03 | 0.03 | 0.03 | 0.03 |
| Evaluation results | Flow value | ×0.01 cm³/sec | | 32.0 | 14.7 | 15.2 | 28.0 | 0.8 | 6.0 | 5.5 |
| | Average film thickness | μm | | 50 | 49 | 54 | 51 | 52 | 51 | 52 |
| | Film thickness standard deviation | μm | | 5.5 | 4 | 5.1 | 5.2 | 1.8 | 1.6 | >7 |
| | UL94 flame retardance | | | Non-conforming | VTM-0 | VTM-0 | VTM-0 | Non-conforming | Non-conforming | Untestable because of large thickness unevenness |

As shown in Table 2, the polycarbonate resin compositions of the Examples contain 73 to 94.5% by mass of the polycarbonate resin (A), 5 to 25% by mass of the phosphorus-based flame retardant (B) and 0.1 to 2% by mass of the fluoropolymer (C), wherein the flow value at 280° C. is adjusted to 1×0.01 to 10×0.01 cm³/sec. All the films produced from these polycarbonate resin compositions of the Examples had excellent flame retardance with a small thickness unevenness.

Meanwhile, as shown in Table 3, in each of Comparative Examples 1-4, wherein the polycarbonate resin composition having a flow value of more than 10×0.01 cm³/sec at 280° C. was used, the molded film had a large thickness unevenness. Further, Comparative Example 5, in which the amount of the phosphorus-based flame retardant (B) in the polycarbonate resin composition was small, and Comparative Example 6, in which the fluoropolymer (C) was not contained, resulted in poor flame retardance. In Comparative Example 7, in which the fluoropolymer (C) was contained excessively, the molded film had a large thickness unevenness, and it was impossible to carry out the flame retardance test.

Thus, it was confirmed that a film/sheet having excellent thin-wall flame retardance with a small thickness unevenness can be produced by using a polycarbonate resin composition, which contains the polycarbonate resin (A), the phosphorus-based flame retardant (B) and the fluoropolymer (C) within predetermined ranges respectively, and which has a specific flow value.

The invention claimed is:

1. A polycarbonate resin composition, which contains 73 to 94.5% by mass of a polycarbonate resin (A), 5 to 25% by mass of a phosphorus-based flame retardant (B) and 0.1 to 2% by mass of a fluoropolymer (C), the composition having a flow value of 1×0.01 to 10×0.01 cm³/sec at 280° C., wherein the polycarbonate resin (A) has a viscosity-average molecular weight of 40,000 to 50,000.

2. The polycarbonate resin composition according to claim 1, wherein the phosphorus-based flame retardant (B) is a phosphazene compound or a condensed-type phosphoric acid ester.

3. The polycarbonate resin composition according to claim 1, wherein the fluoropolymer (C) is a polymer or copolymer comprising a tetrafluoroethylene structure.

4. The polycarbonate resin composition according to claim 1, which is for a sheet or film.

5. A sheet or film, wherein the polycarbonate resin composition according to claim 1 is used.

6. The sheet or film according to claim 5, which has a thickness of 10 to 1000 μm.

7. A method for producing a sheet or film, which comprises extrusion molding the polycarbonate resin composition according to claim 1.

8. The polycarbonate resin composition according to claim 1, wherein the molecular weight distribution of the polycarbonate resin and any carbonate oligomer in the composition is from 2.0 to 3.0.

9. The polycarbonate resin composition according to claim 1, in which the polycarbonate resin (A) is the only polycarbonate resin in the composition.

* * * * *